United States Patent [19]
Khosrowpour

[11] Patent Number: 5,608,275
[45] Date of Patent: Mar. 4, 1997

[54] FAULT TOLERANT ISOLATION BETWEEN DEVICES POWERED BY SEPARATE POWER SOURCES

[75] Inventor: Farzad Khosrowpour, Austin, Tex.

[73] Assignee: Dell USA L.P., Austin, Tex.

[21] Appl. No.: 444,651

[22] Filed: May 19, 1995

[51] Int. Cl.⁶ ................................................. H01H 35/00
[52] U.S. Cl. ............................ 307/130; 307/18; 307/19; 307/20; 307/21; 307/22; 307/23; 307/24; 307/25; 307/26; 307/27; 307/28; 307/29
[58] Field of Search .............................. 307/18–29, 130

[56] References Cited

U.S. PATENT DOCUMENTS 4,890,005 12/1989 Schornack ................................ 307/87

*Primary Examiner*—William M. Shoop, Jr.
*Assistant Examiner*—Kim Lockett
*Attorney, Agent, or Firm*—Stanford & Bennett

[57] ABSTRACT

A fault tolerant isolation system providing fault tolerant electrical isolation between different components receiving power from separate power sources regardless of which of the power sources fails. One power source provides operating voltage to an isolation device, which is a transceiver, buffer, quick switch, etc. The other power source activates a transistor switch coupled to the output enable input of the isolation device, and a current limit device is provided between the output enable and power inputs of the isolation device. In this manner, failure of either power source disables the isolation device and therefore provides fault tolerant isolation between the devices on either side. In the preferred embodiment, the isolation device acts as a high impedance open switch if its power is removed thereby isolating the devices on either side. The transistor switch is implemented using a field-effect transistor (FET), which is deactivated when the other source fails, where the output enable is pulled high by the first power source thereby disabling the outputs of the isolation device. Voltage drop devices such as diodes may be used to lower the voltage of either source to the appropriate operating voltage of the isolation device, if necessary.

23 Claims, 2 Drawing Sheets

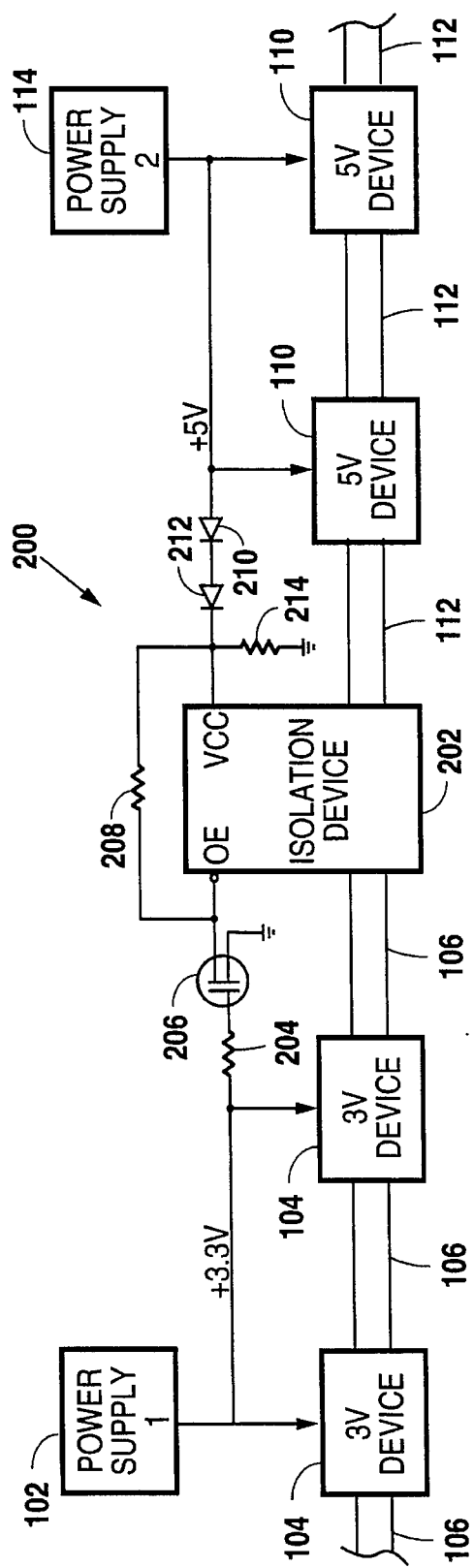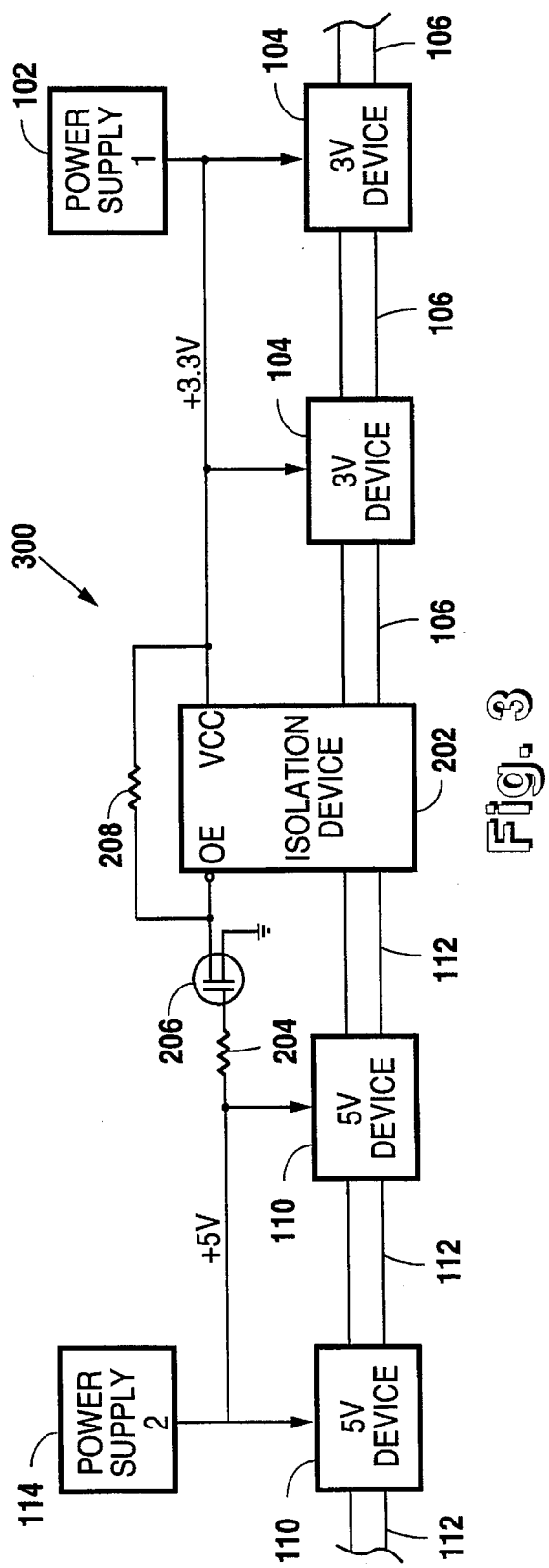

5,608,275

FAULT TOLERANT ISOLATION BETWEEN DEVICES POWERED BY SEPARATE POWER SOURCES

FIELD OF THE INVENTION

The present invention relates to fault tolerant electrical isolation, and more particularly to a method and apparatus for electrically isolating different devices powered by separate power sources in the event of loss or failure of a power source.

DESCRIPTION OF THE RELATED ART

Electronic devices, particularly computer systems, are continually increasing in speed, complexity and capability. At the same time, it is desired to decrease the power consumption of the electronic device as much as possible to save energy and decrease thermal generation. The logic circuits of electronic devices were originally based on a 5 volt (V) standard where the logic signals varied between 0 and 5 V. However, in order to reduce the power consumption, a new 3.3 V standard is becoming more common, and even lower voltage standards are contemplated and being developed. Although many new components operate on the 3.3 V standard (otherwise referred to as 3 V devices), other components still require 5 V, so that it is now common to have multiple voltage sources providing multiple logic voltage levels, such as 5 V, 3.3 V, etc. The 5 V standard is still used since some components operate at higher speeds at the higher voltage level. Also, many common input/output (I/O) bus standards, such as the integrated system architecture (ISA) or Extended-ISA (EISA), require a 5 V power signal for operating with 5 V expansion cards. For example, the EISA bus is based on the 5 V standard, but an expansion card plugged into the EISA bus may be based on the 3.3 V standard and include a separate power source.

The components conforming to two separate voltage standards must often logically communicate with each other. For example, a 3 V expansion card plugged into an EISA bus requires voltage translation and/or buffering between 3.3 V and 5 V logic signals. Also, it may be desired to provide buffering between devices operating at the same voltage level but powered using separate power sources. This may be achieved using one or more 74×245 bus transceiver type devices to perform the desired buffering and/or voltage translation, where the "x" is a variable denoting multiple members of a family of transceiver devices. The 74LVT245 bi-CMOS transceiver device, for example, includes bi-polar and CMOS counterparts for higher drive and higher power capabilities. The 74LVT245 transceiver may be powered through a 3.3 V supply, but is 5 V tolerant and thus allows communication through 3 V and 5 V devices on either side of the transceiver. Although the 74LVT245 transceiver includes bi-polar components and thus is a relatively fast component, it consumes a significant amount of energy.

A related 74LCX245 transceiver is designed using pure CMOS technology, but is also 5 V tolerant and can be used to allow communication between 3 V and 5 V devices. The 74LCX245 transceiver is not as fast as the 74LVT245, but consumes less power. Therefore, the choice between these two transceivers depends on design considerations of speed versus power consumption. Another isolation device which allows significantly faster logic communication between different devices is a bus switch, which is used in situations where speed is desired but where buffering is not necessary. In particular, a bus switch allows fast logic communication but does not provide boost in current or power.

The use of separate power sources increases the chance of full or partial power failure. In spite of failure of one source, it is often desired to maintain partial functionality of those devices being powered by another, functioning power source. For example, it is desired that a computer system including a 5 V I/O bus continue to operate in spite of failure of a separate power supply on a 3 V expansion card. If the expansion card is battery powered, it may be desired to maintain its operation in spite of loss of the 5 V power supply signal on the I/O bus.

Although the transceiver and bus switch devices described above allow communication between different devices during normal operation, the intended use of these devices does not provide the desired fault tolerant isolation in the event of power failure in certain situations. For example, the 74LCX245 transceiver generally requires power from a 3.3 V power supply, but may be used to provide voltage translation between 3 V and 5 V devices. Should the 3.3 V power supply suddenly be disabled, the 74LCX245 provides appropriate isolation between the 3 V and 5 V devices, since the 74LCX245 transceiver becomes a high impedance open switch to the 5 V devices and therefore isolates the 5 V bus from the 3 V expansion card which has suddenly failed. However, if the 5 V power signal is suddenly lost, the 74LCX245 transceiver remains powered through its 3.3 V supply, so that it adversely affects the logic of the 3 V components. In particular, logic glitches from the 5 V bus could be transferred to the 3 V components. Also, the drivers on the 3 V bus may be loaded due to the low impedance characteristic of the transceiver. This situation results in malfunction or even failure of the computer system. Bus switches operate in a similar manner, where loss of power at its power input causes false signals or low impedance loads to appear to the 3 V devices, likely causing faulty operation.

It is therefore desired to provide a fault tolerant isolation system between different components receiving power from different voltage sources and communicating through buffer devices.

SUMMARY OF THE INVENTION

Fault tolerant isolation according to the present invention between different devices prevents translation of data glitches and faulty logic signals and provides appropriate isolation regardless of which of the power sources fails. The circuitry powered by the operating source is not adversely affected, does not receive false signals and is not exposed to low impedance loads potentially causing erroneous operation. According to the present invention, an isolation device receives power from a first power source at its power input, and a second source activates a switch circuit which asserts the enable input of the isolation device. Furthermore, the first power source is connected to the enable input through a current limit device, such as a pull-up resistor. In this manner, if the first power source fails, the isolation device loses power and becomes a high impedance open switch, thereby immediately isolating the components on either side of the device. However, if the second power source fails, it releases the switch allowing the first power source to disable the isolation device through the current limit device. This disabling function provides immediate fault tolerant isolation between the different component types.

In one embodiment, a 5 V supply provides power through one or more series diodes to an isolation device, such as the 74LCX245 bus transceiver. Of course, the isolation device could also be the 74LVT245, a bus switch or any similar type of buffer/switching device. The diodes step the voltage down to approximately 3.3 V, which is the required operating voltage of the transceiver. A resistor coupled between the power input of the transceiver and ground provides sufficient bias current for the diodes. A 3.3 V power supply is connected through a transistor switch circuit, which acts to pull the output enable input of the transceiver low thereby enabling the transceiver when the 3.3 voltage supply is operating. A pull-up resistor connected between the power input and the output enable input allows the 5 V power supply to pull the output enable input high to disable the transceiver in the event the 3.3 V power supply fails or is otherwise disabled. In this manner, the devices on either side of the transceiver are thereby isolated from each other regardless of which power source fails.

In an alternative embodiment, the 3.3 V power supply may be used to power the isolation device and the 5 V supply may be used to activate the switch circuit. The particular embodiment used depends upon the power limitations of the two power sources on either side of the isolation device. The transistor circuit is preferably implemented using a field-effect transistor (FET), which grounds the output enable input thereby enabling the isolation device when the 3.3 V supply is activated.

The isolation device could alternatively be a bus switch or similar type device including an enable input. Also, the present invention is applicable regardless of the voltage levels on either side of the isolation device. For example, two separate 3 V power sources could provide power to different 3 V devices on either side of the isolation device, where fault tolerant isolation is desired between the different devices. In this case, the isolation device could be the 74LVC245 transceiver, which allows 3 V communication but is not 5 V tolerant. Of course, voltage levels other than 3 V and 5 V are contemplated.

It is appreciated that a fault tolerant isolation system according to the present invention provides the desired electrical isolation between devices operating at the same or even different voltage levels, yet communicating through a buffered device. The implementation is easily achieved using off-the-shelf components and thus is cost-effective.

BRIEF DESCRIPTION OF THE DRAWINGS

A better understanding of the present invention can be obtained when the following detailed description of the preferred embodiment is considered in conjunction with the following drawings, in which:

FIG. 2 is a block diagram of a fault tolerant isolation circuit according to the present invention; and FIG. 3 is a block diagram of a fault tolerant isolation circuit according to another embodiment of the present invention.

DETAILED DESCRIPTION OF THE PREFERRED EMBODIMENT

Figure 1:
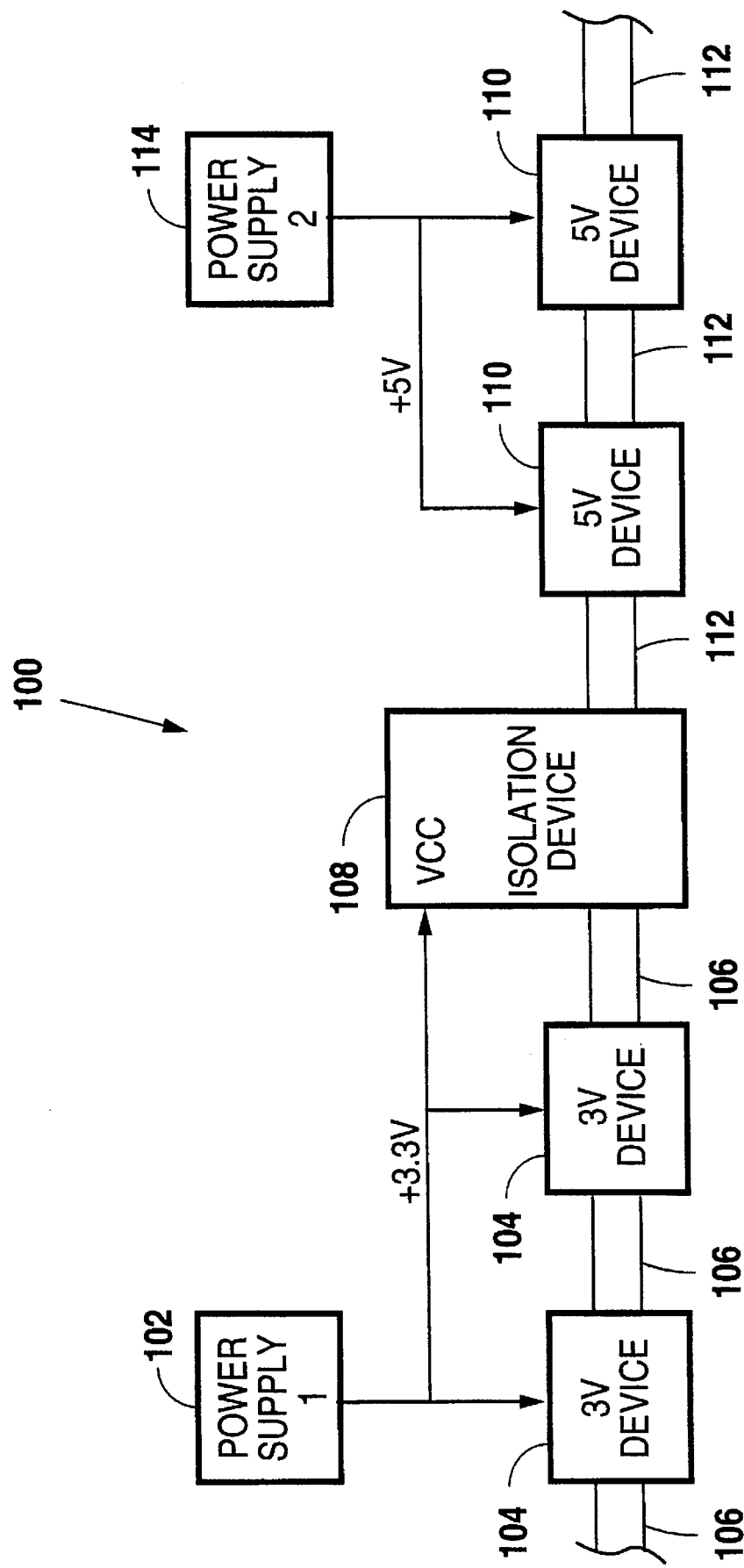
FIG. 1 is a block diagram illustrating conventional connection of an isolating device between components based on different operating voltages.

Referring now to FIG. 1, a block diagram is shown illustrating a conventional isolation system 100 for isolating different components. In particular, the isolation system 100 includes a first power supply 102 for providing a 3.3 V signal to 3 V devices 104 and an isolation device 108. Although the first power supply 102 provides 3.3 V, it is understood that the actual voltage may vary. A plurality of signal lines 106 are shown connected between the 3 V devices 104 and the isolation device 108, representing a plurality of 3 V signals requiring isolation and buffering for logic communication with 5 V devices 110 on the "opposite" side of the isolation device 108. A second power supply 114 provides a +5 V signal to a plurality of 5 V devices 110, which are coupled to the isolation device 108 through a plurality of 5 V signal lines 112.

The isolation device 108 is typically either a bus transceiver or a bus switch type device. In the event buffering is required between the 3 V devices 104 and the 5 V devices 110, the isolation device could be a bi-CMOS 74LVT245 bus transceiver or the like, which provides the required buffering capabilities. However, the 74LVT245 is a combined CMOS and bi-polar device, which is faster but typically consumes a significant amount of power. Alternatively, the isolation device 108 is a low-power 74LCX245 bus transceiver which is a purely CMOS device, thus operating at a slower speed but requiring less power than the 74LVT245. In any event, both the 74LVT245 and 74LCX245 are operated using a 3.3 V power signal, but are also 5 V tolerant and thus are capable of receiving the 5 V logic signals on the signal lines 112. If buffering is not required to be performed, the isolation device 108 could comprise a bus switch which operates significantly faster than transceiver devices. Also, voltage translation may not be required, where the devices on both sides are 3 V, 5 V or any other voltage supported by the isolation device 108. For example, the 74LVC245 transceiver operates at 3 V for 3 V devices on both sides.

The isolation system 100 is not completely fault tolerant. If the first power supply 102 is suddenly disabled or otherwise disconnected, the isolation device 108 loses power and preferably becomes a high-impedance open switch for isolating the 3 V devices 104 from the 5 V devices 110. The 74x245 devices are designed for this purpose and provide effective fault tolerant isolation in this case. However, if the second power supply 114 should fail or otherwise be disconnected, the 5 V devices 110 also lose power and could generate glitches or otherwise cause false signals on the signal lines 112. Even more problematic, the isolation device 108 may exhibit a low impedance characteristic and thereby load drivers of the signal lines 106. The 3 V devices 104 are exposed to the logic glitches, false signals and loads appearing on the signals 106 from the isolation device 108. In this manner, the 3 V devices 104 receive false signals or its drivers are otherwise loaded which could cause improper operation or even failure of the electronic device incorporating the isolation system 100.

Referring now to FIG. 2, a block diagram is shown of one embodiment of a fault tolerant isolation circuit 200 according to the present invention. Similar devices assume identical reference numbers as those shown in FIG. 1. Again, a first power supply 102 provides power through a +3.3 V signal to 3 V devices 104, which receive and generate 3 V signals on a plurality of signal lines 106. Also, a second power supply 114 provides power through a +5 V signal to 5 V devices 110, which receive and generate 5 V signals on a plurality of signal lines 112. An isolation device 202 is provided for isolating the first signal lines 106 from the 5 V signal lines 112. In the preferred embodiment, the output of the 3 V power supply 102 is provided to one end of a resistor 204, having its other end connected to the gate of a field-effect transistor (FET) 206. The FET 206 is preferably the 2N7002 device, although other types of transistors, including similar FETs or even bi-polar transistors are contemplated. The source of FET 206 is connected to ground and its drain is connected to the inverting output enable (OE) input pin of the isolation device 202, which is a transceiver device if buffering is required, or a bus switch device if buffering is not necessary. Examples of transceiver devices are the 74×245 type devices such as the 74LVC245, the 74LVT245 and the 74LCX245. Quick switches, otherwise referred to as bus switches, are manufactured by several suppliers, such as the QuickSwitch® products by Quality Semiconductor, Inc., or the family of bus switches by Texas Instruments, Inc.

The drain of the FET 206 is also connected to one end of a current limit resistor 208, having its other end connected to the VCC input of the isolation device 202. The output of the second power supply 114 is connected to the anode of a diode 210, having its cathode connected to the anode of another diode 212, having its cathode connected to the other end of resistor 208 and to the VCC input of the isolation device 202. A bias resistor 214 is connected between the VCC input of the isolation device 202 and ground.

The diodes 210, 212 reduce the voltage of the +5 V signal to approximately 3.3 V, sufficient for powering the isolation device 202. The resistor 214 provides bias current for the diodes 210, 212. The +3.3 V signal activates the FET 206, thereby pulling the OE input of the isolation device 202 to ground, which enables the outputs of the isolation device 202 during normal operation. The "outputs", of course, depend on the direction of the signal and thus occur on either side. If the first power supply 102 is disabled or otherwise disconnected, the gate of the FET 206 is pulled to ground, thereby deactivating FET 206, so that the OE input of the isolation device 202 is pulled high through current limit resistor 208 through the +5 V signal. In this manner, although the isolation device 202 remains powered through its VCC input, its outputs are disabled or otherwise open circuited, so that the signal lines 106 are isolated from signal lines 112, thereby isolating the 5 V devices from the 3 V devices 104. Thus, any glitches or power surges created by the 3 V devices 104 onto the signal lines 106 are not translated to the signal lines 112. Also, the isolation device 202 does not assert any loads to the drivers of the signal lines 112. This provides fault tolerant isolation in the event the first power supply 102 is disabled.

If the second power supply 114 fails or is otherwise disabled, the isolation device 202 loses power at its VCC input and effectively becomes a high impedance open switch, thereby isolating the 3 V signal lines 106 from the 5 V signal lines 112. This is the operating characteristic of 74×245 type transceivers, including the 74LVT245 and the 74LCX245. In this manner, if the second power supply 114 fails or is disabled, the 3 V devices 104 are completely isolated from the 5 V devices 110, thereby providing fault tolerant isolation in the event of failure of the second power supply 114. It is appreciated that the isolation system 200 provides fault tolerant isolation between the 3 V devices 104 and the 5 V devices 110, regardless of whichever one of the power sources fails or is otherwise disabled. It is also noted that the 74LCX245 device consumes very low current in the off or high impedance mode. This characteristic, combined with the characteristics of the FET 206, results in high integrity power transitions from on to off and vice versa. The 74LCX245 device is preferred f higher speed is desired.

FIG. 3 is a block diagram of an alternative fault tolerant isolation system 300 according to the present invention. Similar devices assume identical reference numbers as those shown in FIG. 2. Again, a second power supply 114 provides a +5 V signal to 5 V devices 110, which communicate to the 3 V devices 104 through isolated bus signal lines 112. Also, the first power supply 102 provides a +3.3 V signal to 3 V devices 104. In this embodiment, however, the first power supply 102 provides the +3.3 V signal directly to the VCC input of the isolation device 202 and to one end of the resistor 208. The other end of the resistor 208 is connected to the source of the FET 206, and to the OE input of the isolation device 202. The drain of FET 206 is connected to ground and its gate is connected to one end of the resistor 204, having its other end receiving the +5 V signal.

Operation is similar to the isolation system 200, except that the second power supply 114 activates the FET 206 to enable the isolation device 202, and the first power supply 102 provides operating power to the isolation device 202. Should the second power supply 114 fail, the +3.3 V signal pulls the OE input of the isolation device 202 high, thereby disabling the outputs of the isolation device 202, providing fault-tolerant isolation between the 5 V devices 110 and the 3 V devices 104. Alternatively, if the first power supply 102 fails, operating voltage is removed from the isolation device 202, which then acts as a high impedance open switch between the signal lines 106 and the signal lines 112. Again, fault tolerant isolation is provided between the 3 V devices 104 and the 5 V devices 110, regardless of which power source fails. It is noted that the power supply having fewer power limitations should be used to provide power to the isolation device 202.

FIGS. 2 and 3 illustrate that the present invention is not limited to any particular voltage levels of the power sources, such as the power supplies 102, 114. In fact, the power sources on either side of the isolation device 202 could be any desirable voltage level, and could even be the same where voltage level translation is not necessary. For example, the two power sources 102, 114 could both be 3 V supplies where the devices 104, 110 are all 3 V devices and the isolation device 202 is a quick switch or the 74LVC245 transceiver. Of course, voltage levels other than 3 V and 5 V are contemplated, where voltage drop devices such as one or more series diodes may be used to decrease the supply voltage to the level needed by the isolation device 202. In any of these embodiments, the present invention provides fault tolerant isolation between the different devices on either side of the isolation device.

It is now appreciated that a fault tolerant isolation system according to the present invention provides the desired electrical isolation between different devices power by different power sources, yet communicating through an isolation device. The isolation device is either a bus transceiver if buffering is desired, such as a 74×245 type device, or alternatively a quick switch type device. The isolation device is any device which includes an enable input for open circuiting its outputs and which acts as a high impedance open switch when it loses power. One power source provides power to the isolation device, while the other power supply activates a switch to assert the enable input of the isolation device. In this manner, failure of either power source disables the isolation device, thereby providing fault tolerant isolation on both sides.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

I claim:

1. A fault tolerant isolation system for an electronic device including two separate power sources for providing first and second operating voltages to corresponding first and second components, respectively, comprising:

an isolation device having a first set of signal terminals for coupling to signals of the first components and a second set of signal terminals for coupling to signals of the second components for allowing buffered communication between the first and second components, said isolation device having a power input and an enable input, wherein the first power source provides power to said isolation device through its power input, said isolation device acting as a high impedance open switch when losing power and open circuiting its outputs if its enable input is not asserted; and a switch circuit controlled by the second operating voltage and for receiving the first operating voltage, said switch circuit coupled to said enable input of said isolation device to enable said isolation device while the second operating voltage is provided and wherein the first operating voltage disables said isolation device when said second operating voltage is not provided.

2. The fault tolerant isolation system of claim 1, wherein the first operating voltage is approximately 5 volts and wherein the second operating voltage is approximately 3.3 volts.

3. The fault tolerant isolation system of claim 1, wherein said isolation device is a multiple signal bi-directional buffer device.

4. The fault tolerant isolation system of claim 3, wherein said buffer device is a low power CMOS transceiver.

5. The fault tolerant isolation device of claim 1, wherein said isolation device is a bus switch.

6. The fault tolerant isolation system of claim 1, further comprising:

a voltage divider coupled between the first operating voltage and ground having a junction coupled to said power input for providing power to said isolation device.

7. The fault tolerant isolation system of claim 6, wherein said voltage divider comprises:

at least one diode coupled between the first operating voltage and said junction; and at least one resistor coupled between said junction and ground.

8. The fault tolerant isolation system of claim 7, wherein said at least one diode comprise two series diodes for lowering the voltage of the first operating voltage to an appropriate operating voltage level for said isolation device.

9. The fault tolerant isolation system of claim 1, further comprising:

a current limiter coupled between said power and enable inputs of said isolation device.

10. The fault tolerant isolation system of claim 9, wherein said current limiter comprises a resistor.

11. The fault tolerant isolation system of claim 1, wherein said switch circuit includes a transistor having a control terminal coupled to receive the second operating voltage and a current path coupled to said enable input of said isolation device.

12. The fault tolerant isolation system of claim 11, wherein said current path is coupled between said enable input and ground, wherein said transistor grounds said enable input thereby enabling said isolation device while the second operating voltage is provided.

13. The fault tolerant isolation system of claim 11, wherein said transistor is a field-effect transistor.

14. The fault tolerant isolation system of claim 11, wherein said current path of said transistor is coupled to the first operating voltage through a resistor.

15. The fault tolerant isolation system of claim 1, wherein said isolation device provides logic translation communication when enabled and provides electrical isolation when disabled.

16. The fault tolerant isolation system of claim 15, wherein said isolation device provides fault tolerant isolation between the first and second components while being enabled or disabled.

17. The fault tolerant system of claim 1, wherein said enable input of said isolation device is an output enable input.

18. An electronic device including different components operating at different voltage levels, comprising:

a first power source for providing a first power signal;

a second power source for providing a second power signal;

a plurality of first components receiving power through said first voltage signal;

a plurality of second components receiving power through said second voltage signal;

an isolation device having a first set of signal terminals for coupling to signals of the first components and a second set of signal terminals for coupling to signals of the second components for allowing buffered communication, said isolation device having a power input and an enable input, wherein the first power source provides power to said isolation device through said power input; and a switch circuit controlled by said second power signal and receiving the first power signal, said switch circuit coupled to said enable input of said isolation device to enable said isolation device while said second power signal is provided and wherein the first power signal disables said isolation device when said second power signal is not provided.

19. The electronic device of claim 18, further comprising:

at least one diode coupled between said first power signal and said power input of said isolation device;

a resistor coupled between said power input of said isolation device and ground; and a current limiter between said power input and said enable input of said isolation device.

20. The electronic device of claim 18, wherein said switch circuit operates as an inverter for enabling the outputs of said isolation device while said second power signal is provided, but otherwise disables the outputs of said isolation device when said second power signal is not provided.

21. The electronic device of claim 18, wherein said isolation device becomes an open circuit for isolating said first components from said second components when said first power signal is not provided.

22. The electronic device of claim 18, wherein said isolation device is a transceiver.

23. The electronic device of claim 18, wherein said isolation device is a bus switch.

* * * * *